US012663325B2

(12) United States Patent
Kuntz et al.

(10) Patent No.: US 12,663,325 B2
(45) Date of Patent: Jun. 23, 2026

(54) METHOD AND DEVICE FOR DETERMINING A DIFFERENCE VALUE BETWEEN TWO MOVEMENTS

(71) Applicant: Robert Bosch GmbH, Stuttgart (DE)

(72) Inventors: Stefan Kuntz, Flein (DE); Michael Kleinknecht, Lehrensteinsfeld (DE); Sina Fella, Neuenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 470 days.

(21) Appl. No.: 18/313,627

(22) Filed: May 8, 2023

(65) Prior Publication Data

US 2024/0019275 A1    Jan. 18, 2024

(30) Foreign Application Priority Data

Jul. 18, 2022    (DE) ...................... 10 2022 207 280.4

(51) Int. Cl.
*G01L 3/10* (2006.01)
*G01D 5/20* (2006.01)

(52) U.S. Cl.
CPC ............ *G01L 3/105* (2013.01); *G01D 5/2053* (2013.01)

(58) Field of Classification Search
CPC . G01L 3/105; G01L 3/109; G01L 5/20; G01L 5/221; G01D 5/204; G01D 5/2053
See application file for complete search history.

(56) References Cited

U.S. PATENT DOCUMENTS 5,641,916 A * 6/1997 Satoh ...................... G01L 3/105
73/862.331
5,841,274 A * 11/1998 Masreliez ............ G01D 5/2053
336/131

2004/0007663 A1 * 1/2004 Steinlechner ............. G01L 3/12
250/231.16
2019/0383679 A1 * 12/2019 Tanaka .................... G01L 3/104
2022/0003618 A1 * 1/2022 Van Rens .......... A63B 21/0051
2022/0057281 A1 * 2/2022 Ausserlechner ......... G01B 7/30
2024/0318984 A1 * 9/2024 Lugani .................... H01F 27/36

FOREIGN PATENT DOCUMENTS

DE          101 42 448 A1      3/2002
DE      10 2008 006 865 A1    8/2009
DE      11 2016 005 661 T5    8/2018

* cited by examiner

*Primary Examiner* — Steven L Yeninas
(74) *Attorney, Agent, or Firm* — Maginot, Moore & Beck LLP

(57)          ABSTRACT

A method for determining a difference value includes multiplying one measurement signal, representing a current mechanical movement acquired at a first periodicity, with a second periodicity of another measurement signal, which represents another current mechanical movement, based on an integer algorithm, and using a potentially occurring arithmetical integer overflow, to provide a resulting multiplication result, and multiplying the other measurement signal by the first periodicity based on an integer algorithm, and using a potentially occurring arithmetical integer overflow to provide a resulting other multiplication result, wherein the measurement ranges for the measurement signal and the other measurement signal are each scaled such that they each apply a full range of a provided integer data type. The method includes determining a difference value between the multiplication result and the other multiplication result using an integer algorithm, and using a potentially occurring arithmetical integer overflow.

11 Claims, 3 Drawing Sheets

METHOD AND DEVICE FOR DETERMINING A DIFFERENCE VALUE BETWEEN TWO MOVEMENTS

This application claims priority under 35 U.S.C. § 119 to patent application no. 10 2022 207 280.4, filed on Jul. 18, 2022 in Germany, the disclosure of which is incorporated herein by reference in its entirety.

The disclosure relates to a method for determining a difference value between two movements. The object of the present disclosure is also a device and a computer program for performing the method.

BACKGROUND

It is known in the prior art to determine an angular position or angular position of a rotor using inductive rotor position sensors by mathematically transforming two measured signals, which are also referred to as measurement signals. For this purpose, a sine channel generally provides a corresponding sine signal of the angular position of the rotor, and a cosine channel provides a corresponding cosine signal of the angular position of the rotor. The current angular position of the rotor can then be calculated from the sine signal and the cosine signal by means of an arc tangent function. The torque being measured is proportional to the angular difference between two rotors, whose respective specific angles can be calculated via the arc function. In this context, a first angle of a first (upper) rotor at an upper side of such a torque sensor is sensed as the first measurement signal, and a second angle of a second (lower) rotor is acquired as the second measurement signal. Depending on a periodicity of the measurement signals acquired, the two angles have a certain periodicity greater than or equal to 1 at which they recur within a mechanical rotation.

Given the same periodicity of the angular measurement between the first and second angles, the difference angle can be calculated by simply subtracting the two measured electrical angles. However, an undesirable inductive coupling of the two sides of the torque sensor can occur in this case. Using unequal periodicities requires a method for calculating the difference angle that is free of output signal irregularities given the discontinuity of the arc tangent function.

A method for determining an angle of rotation and/or an angular difference on a divided shaft on which multiple coding phase traces are arranged is known from DE 101 42 448 A1. Each trace group provides a phase signal via an evaluation unit, which signal is respectively ambiguous with respect to a revolution of the shaft. The at least two phase signals are added together into one signal in a weighted manner and the integer and non-integer portions formed thereby. The non-integer portion is proportional to the angular difference between the two trace groups. The torque can be determined by multiplying the spring rate of an intermediate torsion rod. The unique angle of rotation is determined based on the integer portion of the signal and a phase value, or by means of weighted addition.

Disclosed in DE 10 2008 006 865 A1 is an inductive torque sensor, known in particular for a motor vehicle, which comprises at least one exciter coil, at least one oscillator circuit, which is coupled to the exciter coil and couples one alternating voltage periodic signal into the exciter coil during operation, a stator circuit board having a first receiver means and a second receiver means, which each comprise a number of periodically repeating receiver structures, at least two rotors which are rotatable relative to each other and relative to the stator circuit board and influence the strength of the inductive coupling between the exciter coil and the receiver means, evaluation means, which are suitable for evaluating the signals induced in the receiver means, wherein the number of receiver structures of the first receiver means and the number of receiver structures of the second receiver means have an integer ratio with each other.

Known from DE 11 2016 005 661 T5 is an inductive torque and angle sensor for a steering mechanism which comprises an input shaft connected to an output shaft by a torsion rod. A first coupler is connected to the input shaft, while a second coupler is connected to the output shaft. A first receiver coil and a second receiver coil, each comprising a plurality of oppositely wound loops, are respectively arranged adjacent the first or second couplers, wherein a circuit determines the angular offset between the couplers.

SUMMARY

The advantage of the method for determining a difference value between two movements comprising the features of the disclosure is that a difference angle can be calculated for any desired combinations of torque sensor periodicities. Cost-effective implementation in an integrated circuit is possible by implementing the computational algorithm based on integers without floating point arithmetic. In order to calculate the difference value, and thus also a torque, a first measurement signal is multiplied by the periodicity of a second measurement signal and subtracted from the second measurement signal multiplied by the periodicity of the first measurement signal. In this case, any potentially occurring arithmetical integer overflow is applied at multiple points during the calculation. The measurement signal is in this case scaled in order to apply the full range of an integer data type of the device used to perform the method. For example, when using a device having an 8-bit integer data type range, a 360 degree mechanical rotation corresponds to a decimal value of $2^8$, or 256. When using a device with a 16-bit integer data type range, a 360 degree mechanical rotation corresponds to a decimal value of $2^{16}$, or 65,536. The subtraction sequence is in principle reversible and doing so only changes the sign. In one possible embodiment, upper and lower limits of the angle of difference are also defined, and a fault status is set when they are exceeded. The result of the calculation can optionally be scaled. Additionally or alternatively, an offset comparison for a zero point with no associated torque can be performed. The result of the calculation is proportional to the uniqueness range of the difference value and depends on the periodicity of the two measurement signals.

Embodiments of the present disclosure provide a method for determining a difference value between two movements. At least two different measurement signals are provided, wherein a first measurement signal represents a first current mechanical movement acquired at a first periodicity, and a second measurement signal represents a second current mechanical movement acquired at a second periodicity. A first measurement range for the first measurement signal and a second measurement range for the second measurement signal are each scaled in order to apply a full range of an integer data type provided. In this case, the first measurement signal acquired is multiplied by the second periodicity based on an integer algorithm, and a resulting first multiplication result is provided by applying a potentially occurring arithmetical integer overflow for further processing. The second measurement signal acquired is multiplied by the first periodicity based on the integer algorithm, and a resulting second multiplication result is provided by applying a potentially occurring arithmetical integer overflow for further processing. Based on an integer algorithm, a difference is formed based on the first multiplication result and the second multiplication result, and the resulting difference value is provided by applying a potentially occurring arithmetical integer overflow for further processing.

Further proposed is an inductive sensor arrangement having at least two coupling devices and at least one measured value acquisition device, which comprises at least one circuit board with at least one exciter structure and at least two receiver structures. The at least one exciter structure is coupled to at least one oscillator circuit which, during operation, couples a periodic change signal into the at least one exciter structure. The at least two coupling devices are designed to influence an inductive coupling between the at least one exciter structure and the at least two receiver structures, wherein at least one evaluation and control unit is designed to evaluate signals induced in the at least two receiver structures and to provide at least two different measurement signals to a computing device. The measured value acquisition device features a predetermined range of integer data and is configured to perform the method according to the disclosure for determining a difference value between two movements.

Further proposed is a computer program configured to perform the method according to the disclosure for determining a difference value between two movements.

In the present case, the evaluation and control unit can be understood as an electrical assembly or electric circuitry which processes or evaluates acquired sensor signals. The control unit can comprise an interface, which can be formed by hardware and/or software. Given a hardware design, the interfaces can, e.g., be part of what is referred to as an ASIC system, which includes a wide variety of evaluation and control unit functions. However, it is also possible for the interfaces to be separate, integrated circuits, or to at least partially consist of discrete structural elements. Given a software design, the interfaces can be software modules provided, e.g., on a microcontroller in addition to other software modules. Also advantageous is a computer program product comprising program code stored on a machine-readable carrier, e.g., a semiconductor memory, a hard disk memory, or an optical memory and used in order to perform the evaluation when the program is executed by the control unit.

The mechanical movements can, e.g., be rotational movements of rotors, the difference between the current angular positions of which is to be determined. Alternatively, the mechanical movements can be translational movements, the path difference of which is to be determined by means of an acquired, current differential angular position of the two measurement signals, wherein an acquired, current angular position of the individual measurement signals is proportional to the travel path of the corresponding translational movement. Furthermore, a first mechanical movement can correspond to linear movement along a spatial axis, and a second mechanical movement can correspond to rotation about an axis of rotation, the path difference or angular difference between which is to be determined by means of an acquired, current differential angle position of the two measurement signals.

The exciter structure is hereinafter understood to mean a transmitter coil having a predetermined number of windings, which transmits the alternating signal coupled in by the at least one oscillator circuit. The two receiver structures are preferably designed as receiver coils, which each have a periodically repeating loop structure. In this context, the periodicities of the loop structures of the receiver coils in the two receiver structures are different.

Advantageous improvements to the method for determining a difference value between two movements explained in the disclosure are enabled by the measures and further developments described in the disclosure.

It is particularly advantageous for the difference value to be scaled using a range of uniqueness. The range of uniqueness can be calculated based on the first periodicity and the second periodicity. This means that the range of uniqueness of the difference angle results from the selection of the periodicities. Undesirable inductive coupling effects can be avoided by using different periodicities.

In one advantageous configuration of the method, the two movements can each correspond to a rotational movement about a rotational axis. In this context, the first measurement signal can represent a first electrical angle signal representing a first mechanical angle, and the second measurement signal can represent a second electrical angle signal representing a second mechanical angle. The difference value represents an angular difference between the second mechanical angle and the first mechanical angle.

In one alternative configuration of the method, the two movements can each correspond to linear movement along a spatial axis. In this case, the first measurement signal can represent a first electrical angle signal representing a first linear path, and the second measurement signal can represent a second electrical angle signal representing a second linear path. The difference value represents a path difference between the second linear path and the first linear path. When determining the path difference, the difference value can additionally be scaled using a conversion factor.

As a further alternative configuration of the method, the first mechanical movement can correspond to linear movement along a spatial axis, and the second mechanical movement can correspond to rotational movement about a rotational axis. The first measurement signal can in this case represent a first electrical angular signal representing a linear path, and the second measurement signal can represent a second electrical angular signal representing a mechanical angle. The linear path can be converted into a mechanical angle, or the mechanical angle can be converted to a linear path so that the difference value represents an angle difference or a path difference.

In a further advantageous configuration of the method, the two periodicities can be selected such that the ratio between the first periodicity and the second periodicity is not an integer. For example, the two periodicities can be selected such that the first periodicity and the second periodicity have a common denominator greater than 1. As a result, the resolution of the angular measurement can be increased at the same range of clarity, and/or the range of clarity can be increased at the same resolution needed by the application. The range of uniqueness can preferably be calculated according to Equation (1).

$$U = gcd(P1,P2)*(360°/(P1*P2)) \qquad (1)$$

In this case, (U) represents the range of uniqueness, (gcd) represents the common denominator, (P1) represents the first periodicity, and (P2) represents the second periodicity.

The decimal resolution of the difference measurement can be calculated according to Equation (2).

$$AL = U/IDTB \qquad (2)$$

In this case, (AL) represents the decimal resolution of the difference measurement, (U) represents the range of uniqueness, and (IDTB) represents the decimal value of the integer data type range provided. When an 8-bit integer data type range is provided, (IDTB) corresponds to a decimal value of 256. When a 16-bit integer data type range is provided, (IDTB) corresponds to a decimal value of 65,536.

Embodiment examples of the disclosure are illustrated in the drawings and explained in greater detail in the subsequent description. In the drawings, identical reference numbers refer to components or elements performing identical or similar functions.

DETAILED DESCRIPTION

Figure 1:
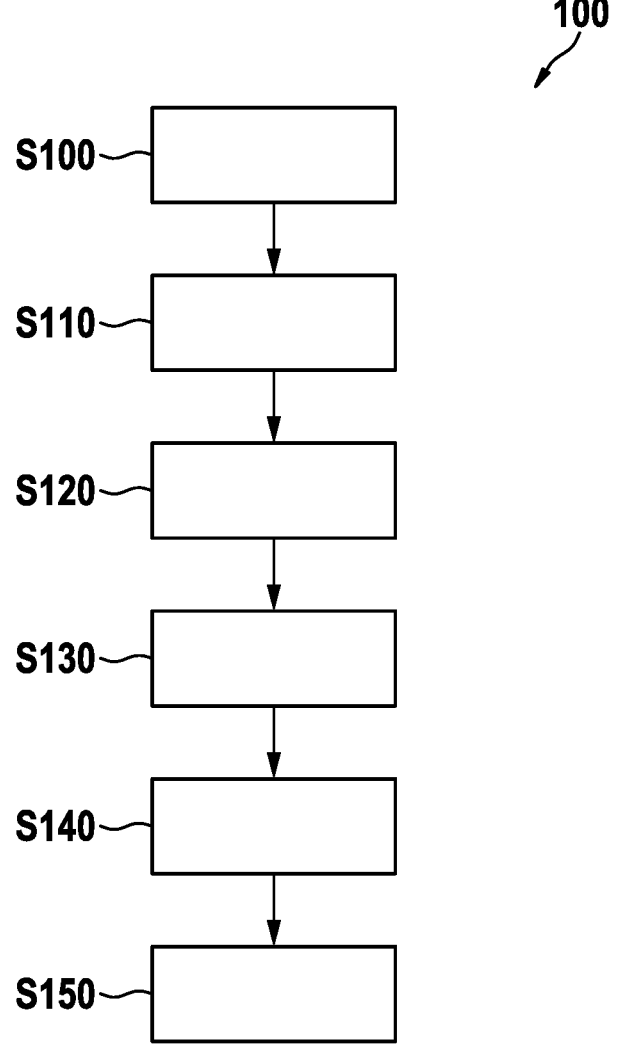
FIG. 1 shows a schematic flow diagram of an embodiment example of a method according to the disclosure for determining a difference value between two movements.
Figure 2:
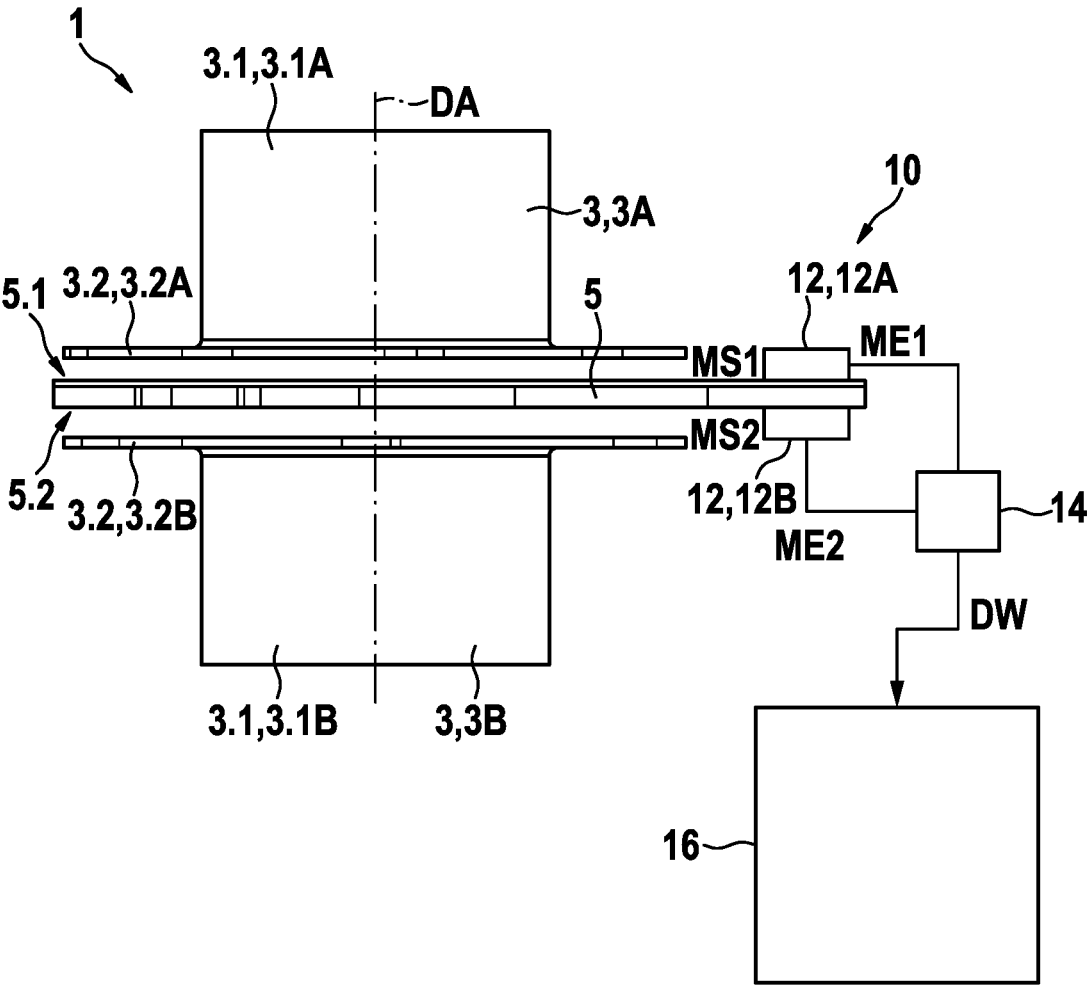
FIG. 2 shows a schematic diagram of an embodiment example of a sensor arrangement according to the disclosure for performing the method according to the disclosure shown in FIG. 1.

As can be seen from FIGS. 1 and 2, the illustrated embodiment example of a method 100 according to the disclosure for determining a difference value DW between two movements comprises a step S100, in which at least two different measurement signals MS1, MS2 are provided. In this case, a first measurement signal MS1 represents a first current mechanical movement acquired at a first periodicity P1, and a second measurement signal MS2 represents a second current mechanical movement acquired at a second periodicity P2. In addition, a first measurement range for the first measurement signal MS1 and a second measurement range for the second measurement signal MS2 are each scaled to take advantage of a full range of an integer data type provided. In step S110, the first measurement signal MS1 acquired is multiplied based on an integer algorithm by the second periodicity P2, and a resulting first multiplication result ME1 is provided in step S120 by applying a potentially occurring arithmetical integer overflow for further processing. In a step S130, the second measurement signal MS2 acquired is multiplied by the first periodicity P1 based on the integer algorithm, and a resulting second multiplication result ME2 is provided in step S140 by applying a potentially occurring arithmetical integer overflow for further processing. In step S150, a difference is formed based on an integer algorithm from the first multiplication result ME1 and the second multiplication result ME2, and the resulting difference value DW is provided for further processing by applying a potentially occurring arithmetical integer overflow.

In an optional method step (not shown in detail), the difference value DW is scaled using a uniqueness range U. The uniqueness range U is calculated based on the first periodicity P1 and the second periodicity P2. Preferably, the range of uniqueness U is calculated according to Equation (1).

In the embodiment example illustrated, the two movements each correspond to a rotational movement about a common rotation axis DA. In this case, the first measurement signal MS1 represents a first electrical angle signal representing a first mechanical angle. The second measurement signal MS2 represents a second electrical angle signal representing a second mechanical angle. The difference value DW represents an angular difference between the second mechanical angle and the first mechanical angle.

Figure 3:
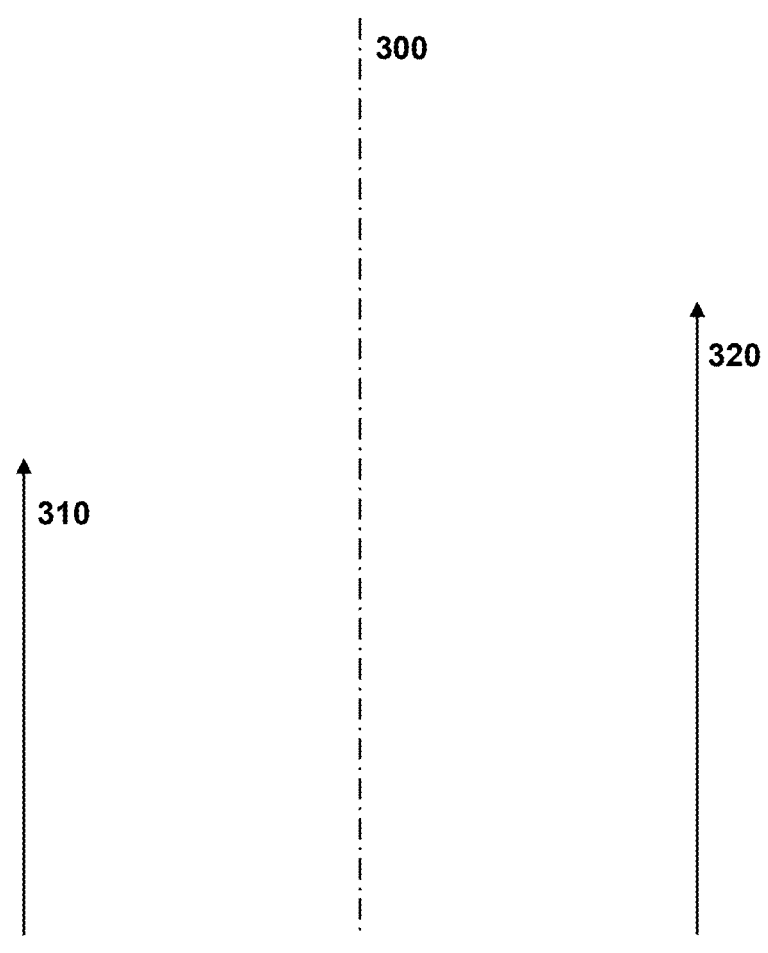
FIG. 3 shows a schematic diagram of an embodiment example in which the two movements each correspond to linear movement along a spatial axis

In an alternative embodiment example, shown in FIG. 3, the two movements each correspond to linear movement along a spatial axis 300. In this case, the first measurement signal MS1 represents a first electrical angle signal representing a first linear path 310. The second measurement signal MS2 represents a second electrical angle signal representing a second linear path 320. The difference value DW represents a path difference between the second linear path and the first linear path. In this embodiment example, the difference value DW is additionally scaled using a conversion factor.

In a further alternative embodiment example (not shown), a first mechanical movement corresponds to linear movement along a spatial axis, and the second mechanical movement corresponds to rotational movement about an axis of rotation. The first measurement signal represents a first electrical angle signal representing a linear path, and the second measurement signal represents a second electrical angle signal representing a mechanical angle. The linear path is in this case converted into a mechanical angle, or the mechanical angle is converted into a linear path so that the difference value represents a path difference or an angle difference.

In the embodiment example illustrated, the two periodicities P1, P2 are selected such that the ratio between the first periodicity P1 and the second periodicity P2 is not an integer. For example, the first periodicity P1 can have a value of 9. The second periodicity P2 can then have a value of 5.

The present method 100 can, e.g., be implemented in software or hardware or in a mixed form of software and hardware, e.g., in a control unit 1.

As can be further seen from FIG. 2, the illustrated embodiment example of a sensor arrangement 1 according to the disclosure comprises at least two coupling devices 3 and at least one measured value acquisition device 10, which comprises at least one circuit board 5 having at least one exciter structure (not shown in detail) and at least two receiver structures (not shown in detail). The at least one exciter structure is coupled to at least one oscillator circuit (not shown in detail) which, during operation, couples a periodic change signal into the at least one exciter structure. The at least two coupling devices 3 are designed to influence an inductive coupling between the at least one exciter structure and the at least two receiver structures, wherein at least one evaluation and control unit 12, 12A, 12B is designed to evaluate signals induced in the at least two receiver structures and to provide at least two different measurement signals MS1, MS2 to a computing device 14. In this case, the measured value acquisition device 10 features a predetermined range of integer data and is configured to perform the method 100 described above for determining a difference value DW between two movements.

As can further be seen in the illustrated embodiment example shown in FIG. 2, the inductive sensor arrangement 1 comprises two coupling devices 3 designed as rotors 3A, 3B, between which the circuit board 5 is arranged. The two rotors 3A, 3B are rotatable relative to each other and relative to the circuit board 5. On its sides 5.1, 5.2 facing the two rotors 3A, 3B, in each case the circuit board 5 has an exciter structure and at least one receiver structure (not shown in detail). In this case, a first exciter structure and two first receiver structures, which are each designed as receiver coils with a periodically repeating loop structure, are arranged on a first side 5.1 (in this case the upper side) of the circuit board 5 and associated with and facing a first (in this case upper) rotor 3A. A first number of the periodically repeating loop structures of the two receiver coils corresponds to the first periodicity P1. In addition, a first of the two first receiver structures forms a sine channel, and a second of the two first receiver structures forms a cosine channel. A second exciter structure and two second receiver structures, which are each designed as receiver coils with a periodically repeating loop structure, are arranged on a second side 5.2 (in this case the lower side) of the circuit board 5 and associated with and facing a second (in this case lower) rotor 3B. A second number of the periodically repeating loop structures of the two receiver coils corresponds to the second periodicity P2. In addition, a first of the two second receiver structures forms a sine channel, and a second of the two second receiver structures forms a cosine channel. The first number of repeating loop structures of the first receiver structures is not identical to the second number of repeating loop structures of the second receiver structures. In addition, the first exciter structure (not shown in detail) is designed as an exciter coil and is coupled to a first oscillator circuit, which is arranged in a first evaluation and control unit 12A and generates a periodic AC voltage signal during operation of the inductive sensor arrangement 1 and couples said signal into the first exciter coil. The second exciter structure (not shown in detail) is also designed as an exciter coil and is coupled to a second oscillator circuit, which is arranged in a second evaluation and control unit 12B and generates a periodic AC signal during operation of the inductive sensor arrangement 1 and couples said signal into the second exciter coil.

The two rotors 3A, 3B are used as rotatable inductive coupling devices 3 which, during rotation, influence the strength of the inductive coupling between the exciter coils and the receiver structures in the receiver structures they are associated with. The rotors 3A, 3B each comprise a cylindrical base body 3.1 on which radially projecting electrically conductive rotor segments 3.2 are arranged. In this case, the first rotor 3A comprises a first base body 3.1A, on which a first number of electrically conductive first rotor segments 3.2A are arranged and have the same first periodicity P1 as the first receiver structures they are associated with. Accordingly, the second rotor 3B also comprises a second base body 3.2B, on which a second number of electrically conductive second rotor segments 3.2B are arranged and have the same second periodicity P2 as the second receiver structures they are associated with. As a result, the difference value DW, which represents a difference angle between the two rotors 3A, 3B, can be determined by determining the difference between the measured angles. The angular positions of the two rotors 3A, 3B are determined independently. For this purpose, the inductive sensor arrangement 1 in the embodiment example illustrated comprises two evaluation and control units 12A, 12B for evaluating the signals induced in the receiver structures during the relative rotation of the two rotors 3A, 3B. By means of embodiments of the sensor arrangement 1 according to the disclosure, the difference value between the angular positions of the two rotors 3A, 3B can be acquired reliably and with few measurement errors. When used in a steering column, the steering torque can be converted into a differential angle by way of a torsion rod arranged in the steering column. The steering angles can be determined via the varying rotation of the two rotors 3A, 3B during corresponding steering movements, which are evaluated according to the differential angle method.

A numerical example for determining a difference value DW between two rotational movements about a rotation axis DA is described below. In this case, 8-bit integer data is provided, so the full range of the type of integer data corresponds to an ITDB decimal numerical value of 256. This means that an ITDB of 256 corresponds to a mechanical rotational angle of the corresponding rotor of 360°. The first periodicity P1 has a numerical value of 9, and the second periodicity P2 has a numerical value of 5. The first measured value MS1 determined by the first evaluation and control unit 12A corresponds to a decimal numerical value of 200. The second measured value MS2 determined by the second evaluation and control unit 12B corresponds to a numerical value of 55.

To determine the difference value DW, the first evaluation and control unit 12A multiplies the first measured value MS1 of 200 by the second periodicity of 5. This multiplication results in a decimal numerical value of 1,000, which is output to the computing device 14 by virtue of a three-fold overflow of the maximum decimal ITDB numerical value of 256 for the full range of 8-bit ITDB type integer data, giving a value of 232 as the first multiplication result ME1 from the first evaluation and control unit 12A. The second evaluation and control unit 12B multiplies the second measured value MS2 of 55 by the first periodicity of 9. This multiplication yields a decimal numerical value of 495, which is output to the computing device 14 by virtue of a simple overflow of the maximum decimal ITDB numerical value of 256 for the full range of 8-bit ITDB type integer data, giving a value of 239 as the second multiplication result ME2 from the second evaluation and control unit 12B. The computing device 14 calculates the difference from the first multiplication result ME1 (232) and the second multiplication result ME2 (239). This difference corresponds here to a decimal numerical value of −7. This negative numerical value of −7 is output to the control unit 16 by overflowing the unsigned 8-bit integer data used having a value of 249=(256−7) and acting as the difference value DW for further processing. In the numerical example selected, the range of uniqueness U according to Equation (1) $U=\gcd(P1,P2)*(360°/(P1*P2))$ =1*(360°/(9*5)) has a value of 8°. Based the difference value of 249, a WD angular difference according to equation (3) can be calculated by means of scaling.

$$WD=U*(DW/ITDB) \tag{3}$$

In this case, (U) represents the uniqueness range, (DW) represents the difference value, and (ITDB) represents the maximum numeric value of the type of integer data used.

In the numerical example selected, the angular difference WD according to Equation (3) WD=U(DW/ITDB)=8°* (249/256) has a value of approximately 7.78°. Regarding the resolution of the angular difference WD, a value of 0.03125° results for a uniqueness range U of 8° and the maximum numerical value for ITBD type integer data of 256.

In addition, an offset adjustment can be performed for a zero point with no torque application. This scale and/or the offset adjustment can be performed in computing device 14 and/or in the control unit 16.

Of course, in alternative embodiment examples, other integer data type ranges can be provided, e.g., 16-bit or 32-bit.

In one alternative embodiment example of the method 100 according to the disclosure, the two periodicities P1, P2 are selected such that the first periodicity P1 and the second periodicity P2 have a common denominator greater than 1.

What is claimed is:

1. A method for determining a difference value between two movements, comprising:

providing an inductive sensor arrangement having (i) at least two coupling devices, and (ii) at least one measured value acquisition device including at least one circuit board having at least one exciter structure and at least two receiver structures, wherein the at least one exciter structure is coupled to at least one oscillator circuit which, during operation, couples a periodic change signal into the at least one exciter structure, wherein the at least two coupling devices are designed to influence inductive coupling between the at least one exciter structure and the at least two receiver structures;

outputting, with the inductive sensor arrangement, at least two different measurement signals including a first measurement signal which represents a first current mechanical movement acquired at a first periodicity, and a second measurement signal which represents a second current mechanical movement acquired at a second periodicity, wherein a first measurement range for the first measurement signal and a second measurement range for the second measurement signal are each scaled such that they each apply a full range of a provided integer data type having a predetermined number of bits;

multiplying, with a computing device, the first measurement signal by the second periodicity based on at least one integer algorithm in a manner allowing for arithmetical integer overflow to provide a resulting first multiplication result;

multiplying, with the computing device, the second measurement signal by the first periodicity based on the at least one integer algorithm in a manner allowing for arithmetical integer overflow to provide a resulting second multiplication result;

determining, with the computing device, a difference value between the first multiplication result and the second multiplication result using the at least one integer algorithm, and using a third potentially occurring arithmetical integer overflow; and providing, with the computing device, the determined difference value to a control unit.

2. The method according to claim 1, wherein the difference value is scaled using a range of uniqueness.

3. The method according to claim 2, wherein the range of uniqueness is calculated based on the first periodicity and the second periodicity.

4. The method according to claim 1, wherein:

the first current mechanical movement corresponds to a first rotation about an axis of rotation;

the second current mechanical movement corresponds to a second rotation about the axis of rotation;

the first measurement signal represents a first electrical angle signal representing a first mechanical angle;

the second measurement signal represents a second electrical angle signal representing a second mechanical angle; and the difference value represents an angular difference between the second mechanical angle and the first mechanical angle.

5. The method according to claim 1, wherein;

the first current mechanical movement corresponds to a first linear movement along a spatial axis;

the second current mechanical movement corresponds to a second linear movement along the spatial axis;

the first measurement signal represents a first electrical angle signal representing a first linear path along the spatial axis;

the second measurement signal represents a second electrical angle signal representing a second linear path along the spatial axis; and the difference value represents a path difference between the second linear path and the first linear path.

6. The method according to claim 1, wherein:

the first current mechanical movement corresponds to a first linear movement along a spatial axis;

the second current mechanical movement corresponds to a first rotation about an axis of rotation;

the first measurement signal represents a first electrical angle signal representing a linear path;

the second measurement signal (MS2) represents a second electrical angle signal representing a mechanical angle; and the linear path is converted into a mechanical angle and the difference value represents an angular difference, or the mechanical angle is converted into a linear path and the difference value represents a path difference.

7. The method according to claim 5, wherein the difference value is additionally scaled using a conversion factor.

8. The method according to claim 1, wherein the two periodicities are selected such that a ratio between the first periodicity and the second periodicity is not an integer.

9. The method according to claim 8, wherein the two periodicities are selected such that the first periodicity and the second periodicity have a common divisor greater than 1.

10. An inductive sensor arrangement, comprising:

at least two coupling devices; and at least one measured value acquisition device including:

at least one circuit board having at least one exciter structure and at least two receiver structures, wherein the at least one exciter structure is coupled to at least one oscillator circuit which, during operation, couples a periodic change signal into the at least one exciter structure, wherein the at least two coupling devices are designed to influence inductive coupling between the at least one exciter structure and the at least two receiver structures, a computing device, and at least one evaluation and control unit designed to evaluate signals induced in the at least two receiver structures and to provide a first measurement signal which represents a first current mechanical movement acquired at a first periodicity, and a second measurement signal which represents a second current mechanical movement acquired at a second periodicity, to the computing device, wherein the measured value acquisition device includes a predetermined range of integer data and is configured to:

multiply the first measurement signal by the second periodicity based on at least one integer algorithm, and in a manner allowing for arithmetical integer overflow to provide a resulting first multiplication result;

multiply the second measurement signal by the first periodicity based on the at least one integer algorithm, and in a manner allowing for arithmetical integer overflow to provide a resulting second multiplication result;

determine a difference value between the first multiplication result and the second multiplication result using the at least one integer algorithm, and using a third potentially occurring arithmetical integer overflow; and provide the determined difference value to a control unit.

11. A non-transitory computer-readable medium storing a computer program configured to be executed by a computing device to:

obtain, from an inductive sensor arrangement, at least two different measurement signals including a first measurement signal which represents a first current mechanical movement acquired at a first periodicity, and a second measurement signal which represents a second current mechanical movement acquired at a second periodicity, wherein a first measurement range for the first measurement signal and a second measurement range for the second measurement signal are each scaled such that they each apply a full range of a provided integer data type having a predetermined number of bits;

multiply the first measurement signal by the second periodicity based on at least one integer algorithm, and in a manner allowing for arithmetical integer overflow to provide a resulting first multiplication result;

multiply the second measurement signal by the first periodicity based on the at least one integer algorithm, and in a manner allowing for arithmetical integer overflow to provide a resulting second multiplication result;

determine a difference value between the first multiplication result and the second multiplication result using the at least one integer algorithm, and using a third potentially occurring arithmetical integer overflow; and provide the determined difference value to a control unit, wherein the inductive sensor arrangement has (i) at least two coupling devices, and (ii) at least one measured value acquisition device including at least one circuit board having at least one exciter structure and at least two receiver structures, wherein the at least one exciter structure is coupled to at least one oscillator circuit which, during operation, couples a periodic change signal into the at least one exciter structure, wherein the at least two coupling devices are designed to influence inductive coupling between the at least one exciter structure and the at least two receiver structures.

* * * * *